US011189123B2

(12) United States Patent
Tamahashi et al.

(10) Patent No.: US 11,189,123 B2
(45) Date of Patent: Nov. 30, 2021

(54) PAPER MONEY HANDLING APPARATUS

(71) Applicant: FUJITSU FRONTECH LIMITED, Tokyo (JP)

(72) Inventors: Tomoyuki Tamahashi, Inagi (JP); Daiki Harai, Inagi (JP)

(73) Assignee: FUJITSU FRONTECH LIMITED, Inagi (JP)

( * ) Notice: Subject to any disclaimer, the term of this patent is extended or adjusted under 35 U.S.C. 154(b) by 69 days.

(21) Appl. No.: 16/719,276

(22) Filed: Dec. 18, 2019

(65) Prior Publication Data

US 2020/0126340 A1 Apr. 23, 2020

Related U.S. Application Data

(63) Continuation of application No. PCT/JP2017/026427, filed on Jul. 21, 2017.

(51) Int. Cl.
*G06Q 40/00* (2012.01)
*G07D 11/00* (2019.01)
(Continued)

(52) U.S. Cl.
CPC ............. *G07D 11/40* (2019.01); *G07D 11/14* (2019.01); *G07D 11/18* (2019.01); *G07D 2211/00* (2013.01)

(58) Field of Classification Search
CPC ........... B65H 2701/1912; G07D 11/14; G07D 2211/00; G07D 11/18; G07D 11/40;
(Continued)

(56) References Cited

U.S. PATENT DOCUMENTS

2009/0057423 A1* 3/2009 Nobuhara ................. G07F 9/04 235/7 A
2010/0168902 A1* 7/2010 Mizushima ............ G07D 11/23 700/214

(Continued)

FOREIGN PATENT DOCUMENTS

DE 102009035938 A1 2/2011
EP 2950280 A1 12/2015

(Continued)

OTHER PUBLICATIONS

Office action issued in corresponding CN patent application No. 201780092933.X, dated Feb. 26, 2021 (with full machine translation).

(Continued)

*Primary Examiner* — Tuyen K Vo
(74) *Attorney, Agent, or Firm* — Greer Burns & Crain Ltd.

(57) ABSTRACT

A paper money handling apparatus includes a dispenser unit to dispense paper money, and the dispenser unit includes a bottom portion on which at least a portion on a front side of the paper money is placed, a pair of side walls located at both the left and right sides of the bottom portion, a front wall located at a front edge of the bottom portion, and a cover located above the bottom portion. A front edge of the dispenser unit has cutouts at least in the bottom portion and the front wall, and the cover is arranged in an openable or closable manner so that the cover rotates and opens from a side of the front edge.

7 Claims, 9 Drawing Sheets

(51) Int. Cl.

| | |
|---|---|
| ***G07F 19/00*** | (2006.01) |
| ***G07D 11/40*** | (2019.01) |
| ***G07D 11/14*** | (2019.01) |
| *G07D 11/18* | (2019.01) |

(58) Field of Classification Search

CPC ..... G07D 11/009; G07F 19/202; G07F 19/20; G07F 19/203; G07F 7/04

USPC .......................................................... 235/379

See application file for complete search history.

(56) References Cited

U.S. PATENT DOCUMENTS

| | | | | |
|---|---|---|---|---|
| 2011/0198191 | A1* | 8/2011 | Nireki .................... | B65H 43/06 194/206 |
| 2012/0193190 | A1* | 8/2012 | Yokote ................... | G07D 11/14 198/418 |
| 2014/0069768 | A1* | 3/2014 | Yokote ................. | G07D 11/235 194/200 |
| 2014/0069769 | A1* | 3/2014 | Kobayashi ............. | G07D 11/00 194/206 |
| 2015/0170451 | A1* | 6/2015 | Karasawa .............. | G07D 11/14 194/346 |
| 2017/0011579 | A1* | 1/2017 | Akagi .................... | G07D 11/22 |
| 2017/0140598 | A1* | 5/2017 | Muta ........................ | B65H 3/34 |
| 2017/0270736 | A1* | 9/2017 | Saiki ........................ | G07D 9/00 |

FOREIGN PATENT DOCUMENTS

| | | | |
|---|---|---|---|
| JP | 58225480 | A | 12/1983 |
| JP | 59162547 | U | 10/1984 |
| JP | 8123993 | A | 5/1996 |
| JP | 2010267178 | A | 11/2010 |
| JP | 4849394 | B2 | 10/2011 |
| JP | 5335877 | B2 | 8/2013 |
| JP | 2015225622 | A | 12/2015 |
| JP | 2016048480 | A | 4/2016 |
| KR | 2020130001398 | U | 3/2013 |

OTHER PUBLICATIONS

ISR issued in Int'l. App. No. PCT/JP2017/026427, dated Aug. 22, 2017.

Written Opinion of the ISA of PCTIJP2017/026427, dated Aug. 22, 2017 (with partial translation).

EESR issued in European patent application No. EP17918676.2, dated Feb. 5, 2021.

* cited by examiner

PAPER MONEY HANDLING APPARATUS

CROSS-REFERENCE TO RELATED APPLICATION

This application is continuation application of International Application PCT/JP2017/026427 filed on Jul. 21 2017 and designated the U.S., the entire contents of which are incorporated herein by reference.

FIELD

The present invention relates to a paper money handling apparatus including a dispenser unit for dispensing paper money.

BACKGROUND

Paper money handling devices having cutouts for inserting fingers of a customer into a dispenser unit have been proposed in the past in order for the customer to easily pick up and take out paper money dispensed in the dispenser unit (see Japanese Laid-Open Patent Publication No. 2010-267178, Japanese Patent No. 5335877 and Japanese Patent No. 4849394 for example).

SUMMARY

In one aspect, a paper money handling apparatus is a paper money handling apparatus including a dispenser unit to dispense paper money, and the dispenser unit includes a bottom portion on which at least a portion on a front side of the paper money is placed, a pair of side walls located at both the left and right sides of the bottom portion, a front wall located at a front edge of the bottom portion, and a cover located above the bottom portion. A front edge of the dispenser unit has cutouts at least in the bottom portion and the front wall, and the cover is arranged in an openable or closable manner so that the cover rotates and opens from a side of the front edge.

DESCRIPTION OF EMBODIMENTS

Paper money dispensed to a dispenser unit, may not be accurately dispensed to a desirable dispense position particularly when the paper money is curled. In this case, when the paper money is not dispensed to the desirable dispense position, a customer may have difficulty in retrieving the paper money even when the above-described cutout is provided to the dispenser unit to help the customer pick up the paper money.

In the following description, a paper money handling apparatus according to one of embodiments of the present invention is explained with reference to drawings.

Figure 1:
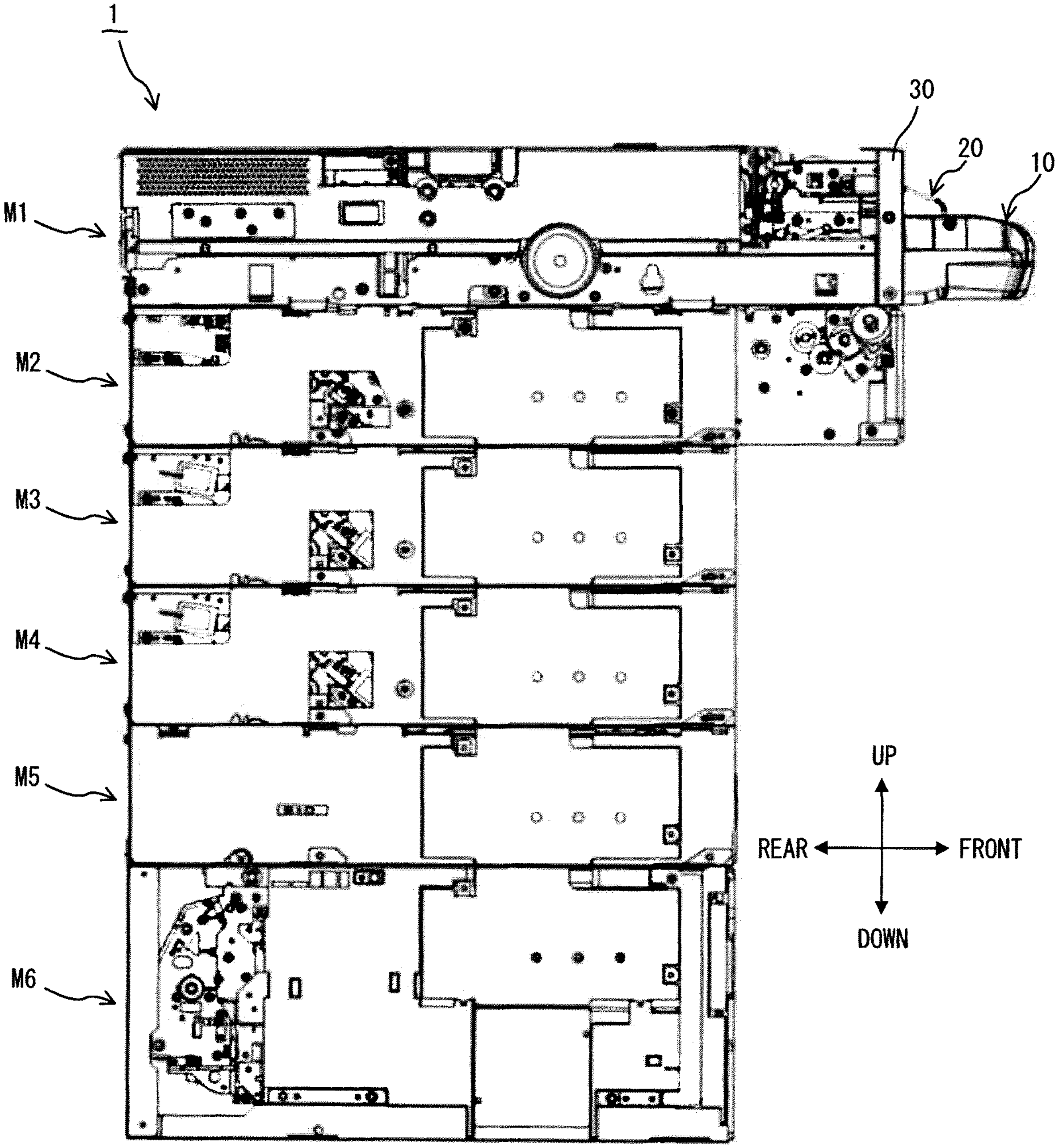
FIG. 1 is a left side view of a paper money handling apparatus.

FIG. 1 is a left side view of a paper money handling apparatus 1.

Figure 2A:
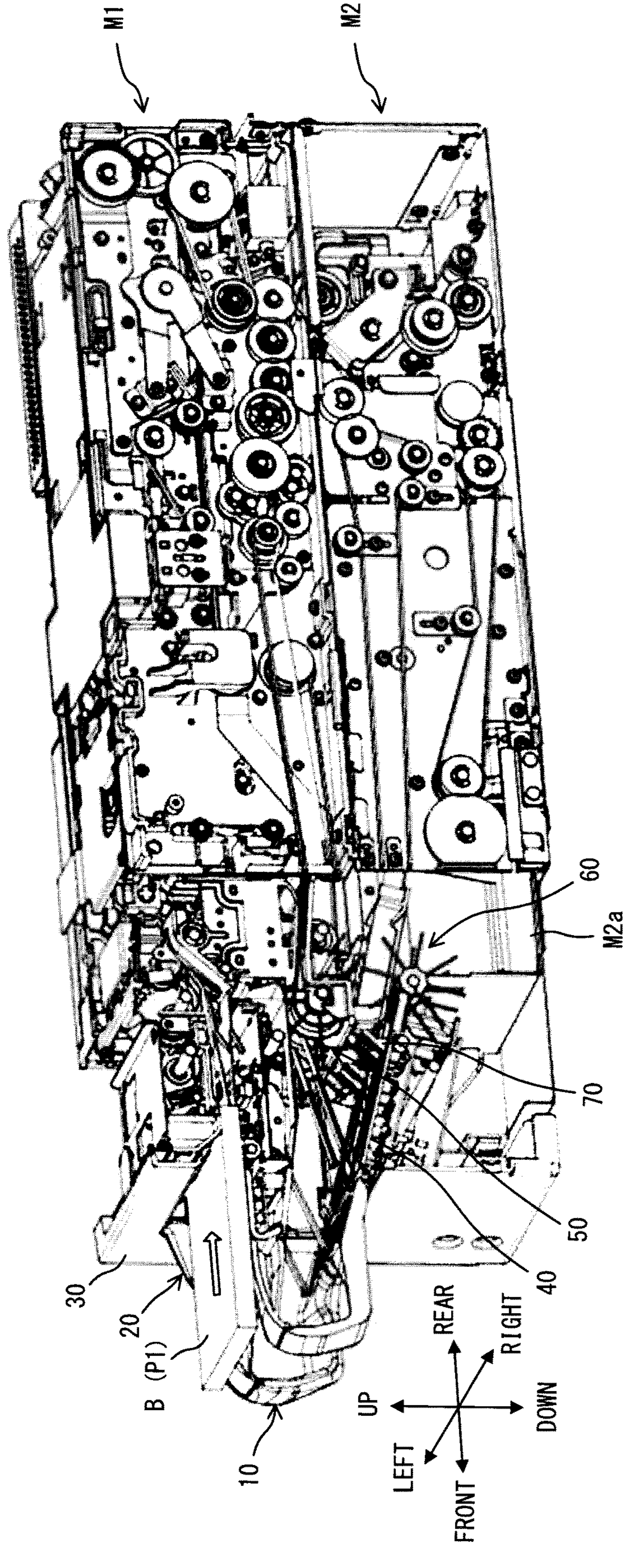
FIG. 2A is a perspective view (1) illustrating an internal structure of a top module and a take-in and recycle module.
Figure 2B:
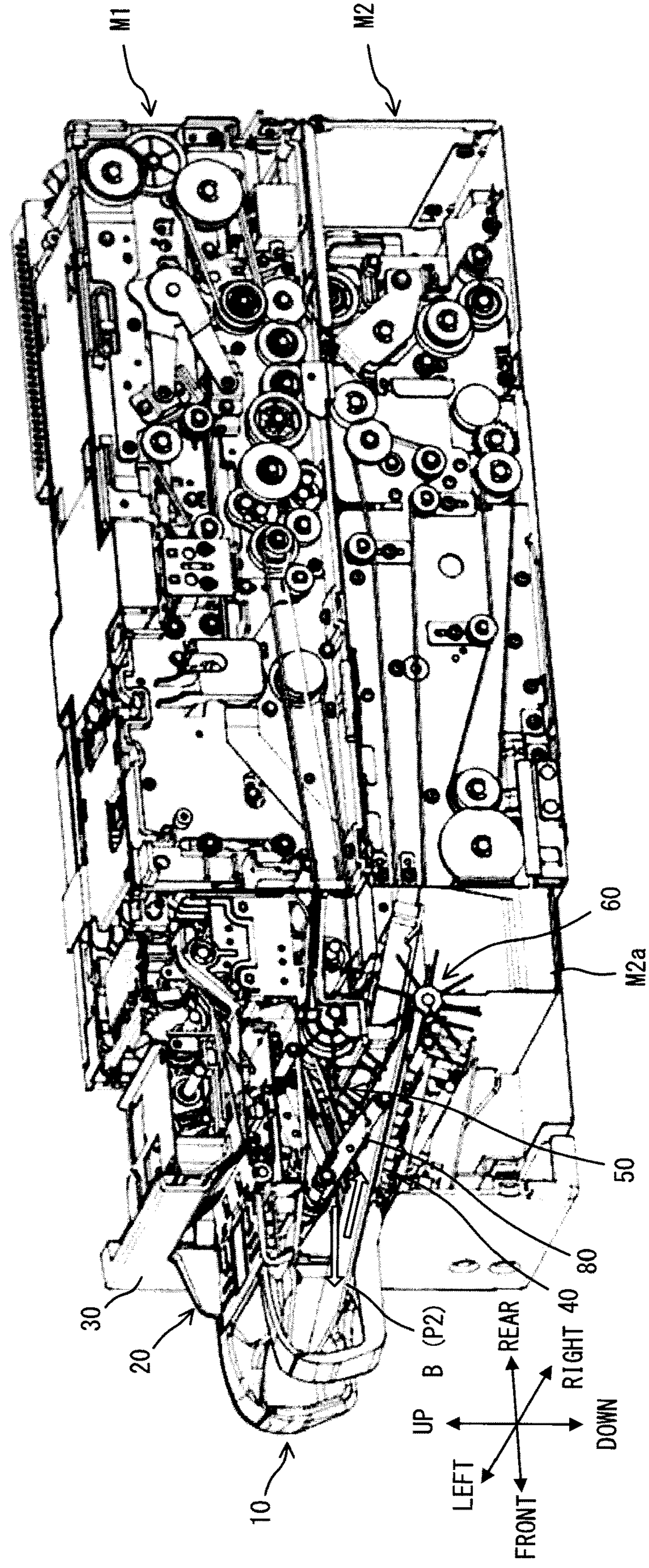
FIG. 2B is a perspective view (2) illustrating an internal structure of a top module and a take-in and recycle module.

FIG. 2A and FIG. 2B are perspective views illustrating an internal structure of a top module M1 and a take-in and recycle module M2 of the paper money handling apparatus 1.

Note that for convenience in explanation, a front-to-rear direction, a left-to-right direction, and an up-to-down direction are indicated in FIG. 1 to FIG. 2B, and also in FIG. 3A to FIG. 7, which are described later. This is merely an example, but the front-to-rear direction and the left-to-right direction are horizontal directions and the up-to-down direction is a vertical direction.

As illustrated in FIG. 1, the paper money handling apparatus 1 includes a top module M1, a take-in and recycle module M2, recycle modules M3 and M4, a supplementary module M5, and a collection module M6 in this order from the top.

The top module M1 has a deposit unit 20 for receiving paper money B when the paper money B is located at a deposit position P1 illustrated in FIG. 2A and a dispenser unit 10 for dispensing the paper money B when the paper money B is located at a dispense position P2 illustrated in FIG. 2B, both of which are provided in a front edge that is projected toward the front. In addition, the top module M1 has a carrier unit such as a dispensing carrier 50 that carries the paper money B to the dispenser unit 10 through a stage 40 on which a portion on the rear side of the paper money B is placed when the paper money B is located at the dispense position P2 and a discrimination unit that discriminates the paper money B.

In the take-in and recycle module M2, a take-in containment unit M2*a* and a take-in carrier 60 that carries paper money B into the take-in containment unit M2*a* are arranged. When a customer leaves paper money B dispensed to the dispenser unit 10, and this remaining paper money B is detected, the take-in carrier 60 carries the remaining paper money B into the take-in containment unit M2*a*.

Furthermore, as illustrated in FIG. 2A, the take-in and recycle module M2 has a gate 70 that moves between a block position to block a carrier path of paper money B to the take-in containment unit M2*a* when the paper money B is on the stage 40 and a retraction position to which the gate 70 is retracted from the block position. Moreover, as illustrated in FIG. 2B, a pressing unit 80 that presses paper money B from above and holds the paper money B being carried by the take-in carrier 60 is arranged above the stage 40.

A recycle paper money containment unit, which is not illustrated, that contains paper money wrapped with a film, for example, is arranged in the rearward of the take-in containment unit M2*a* of the take-in and recycle module M24 and each of a front portion and a rear portion in each of the recycle modules M3 and M4.

The supplementary module M5 contains paper money B used for dispensing. The collection module M6 contains paper money B that is not recycled from among deposited paper money B.

Figure 3A:
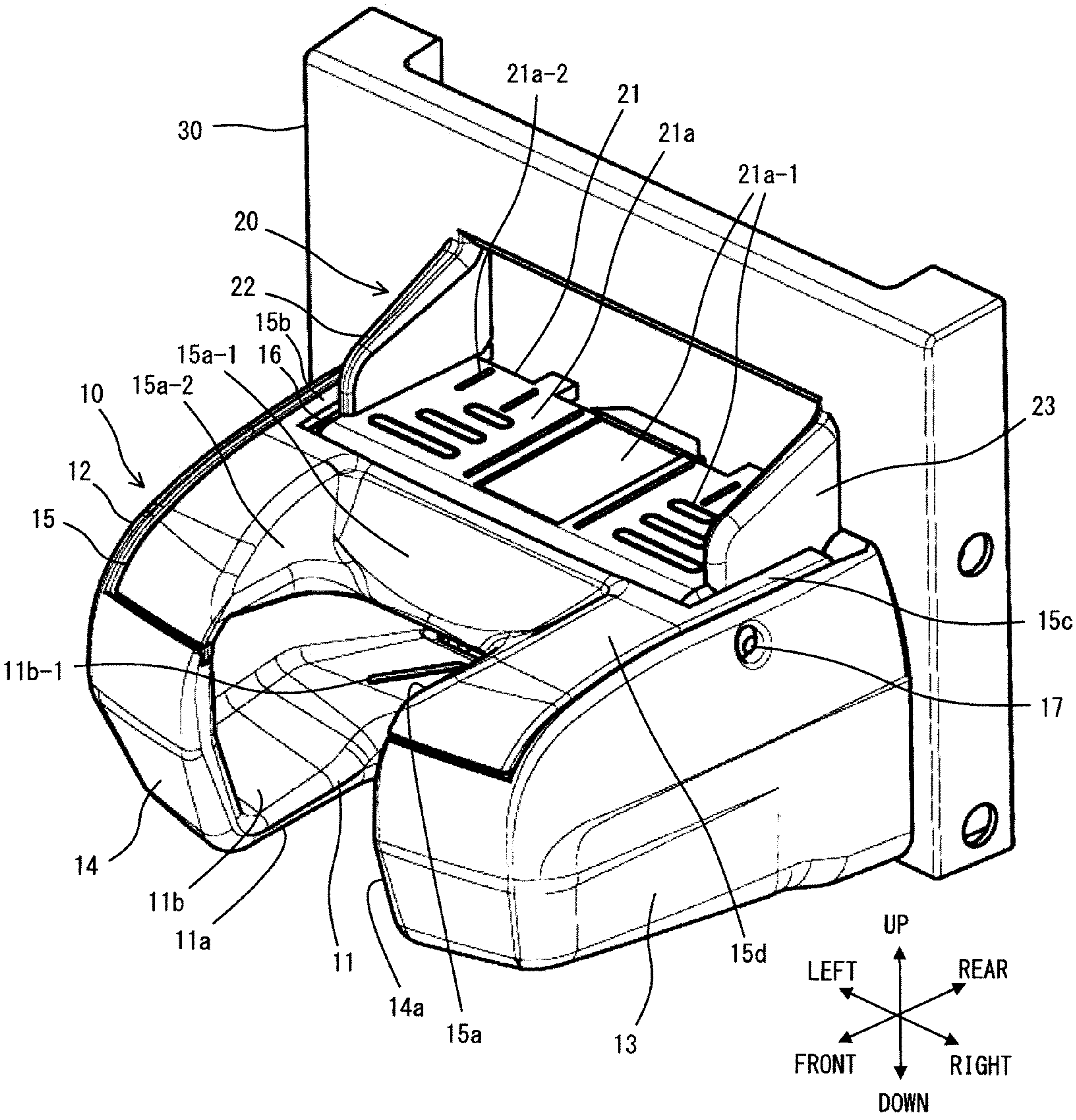
FIG. 3A is a perspective view illustrating a dispenser unit and a deposit unit in a state in which a cover is closed.
Figure 3B:
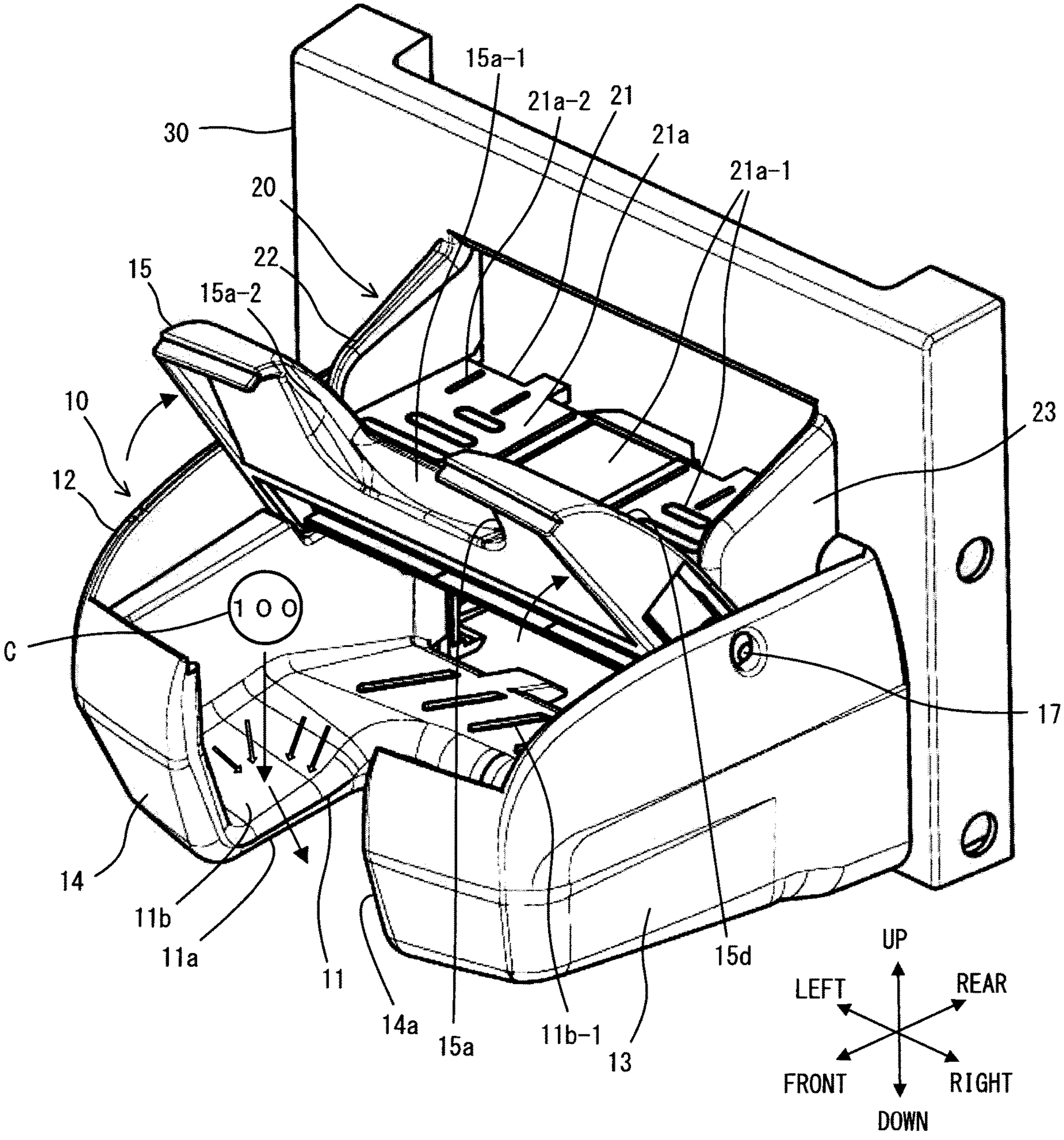
FIG. 3B is a perspective view illustrating a dispenser unit and a deposit unit in a state in which a cover is open.

FIG. 3A is a perspective view illustrating the dispenser unit 10 and the deposit unit 20 in a state in which a cover 15 is closed. FIG. 3B is a perspective view illustrating the dispenser unit 10 and the deposit unit 20 in a state in which the cover 15 is open.

Figure 4:
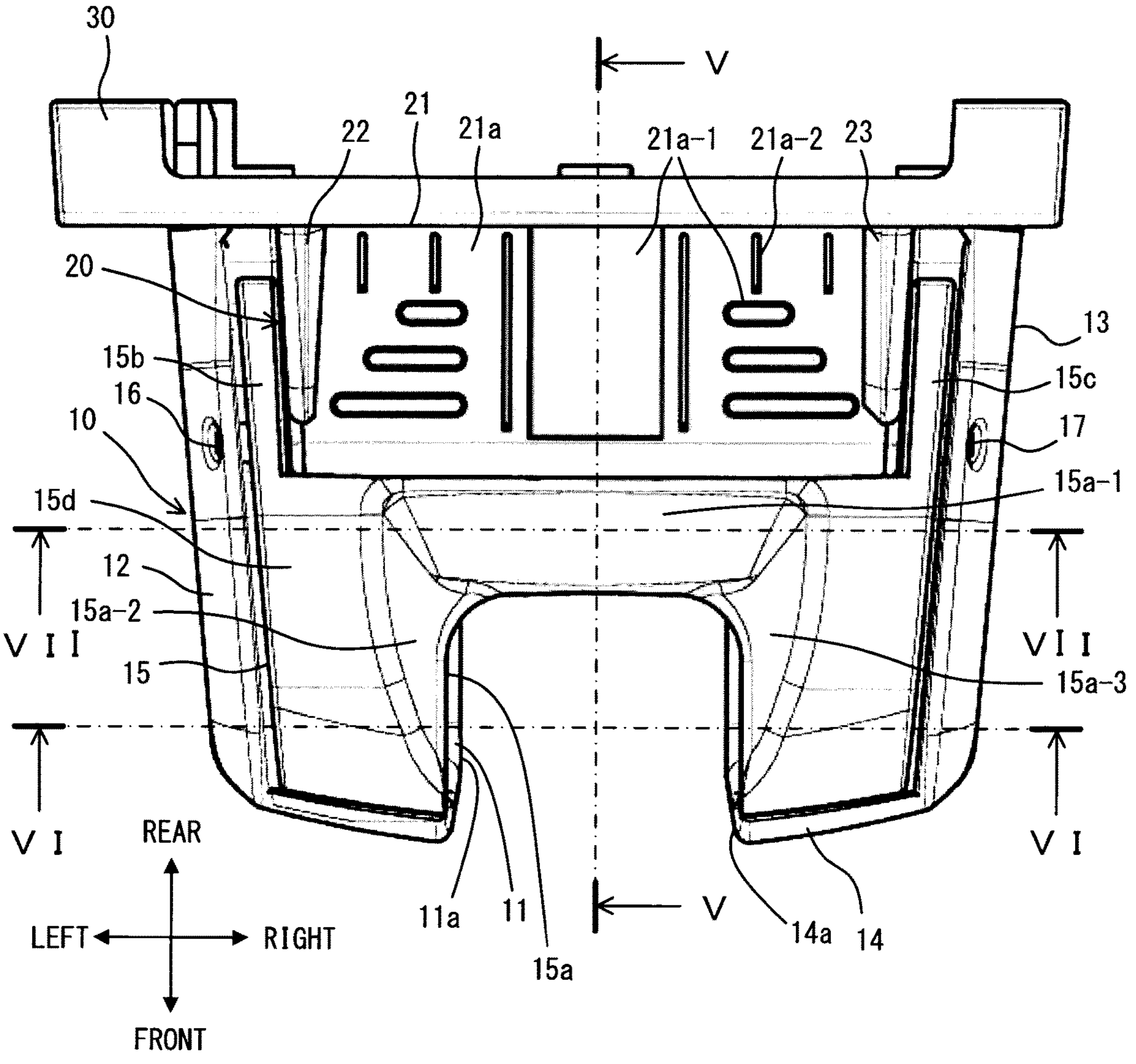
FIG. 4 is a top view illustrating a dispenser unit and a deposit unit.

FIG. 4 is a top view illustrating the dispenser unit 10 and the deposit unit 20.

Figure 5:
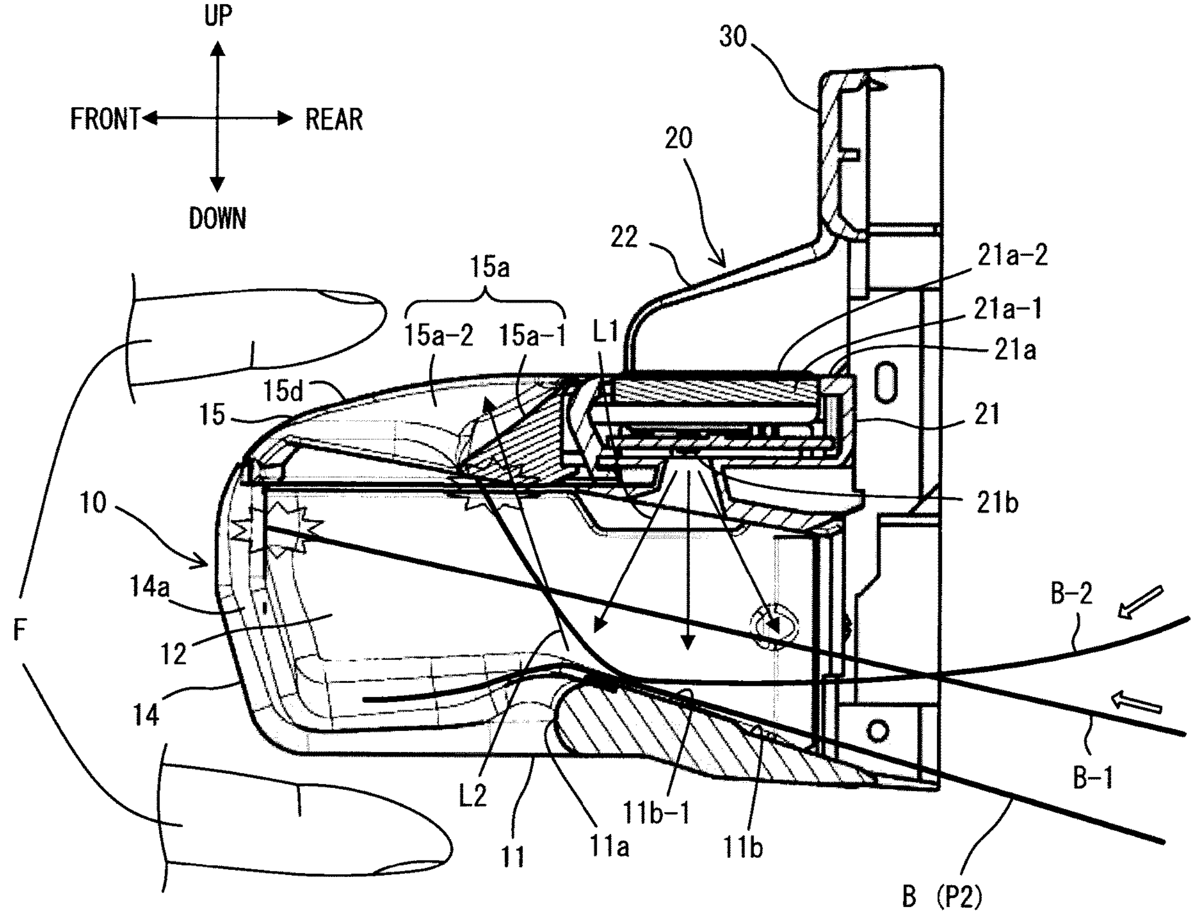
FIG. 5 is a cross-section at V-V in FIG. 4.
Figure 6:
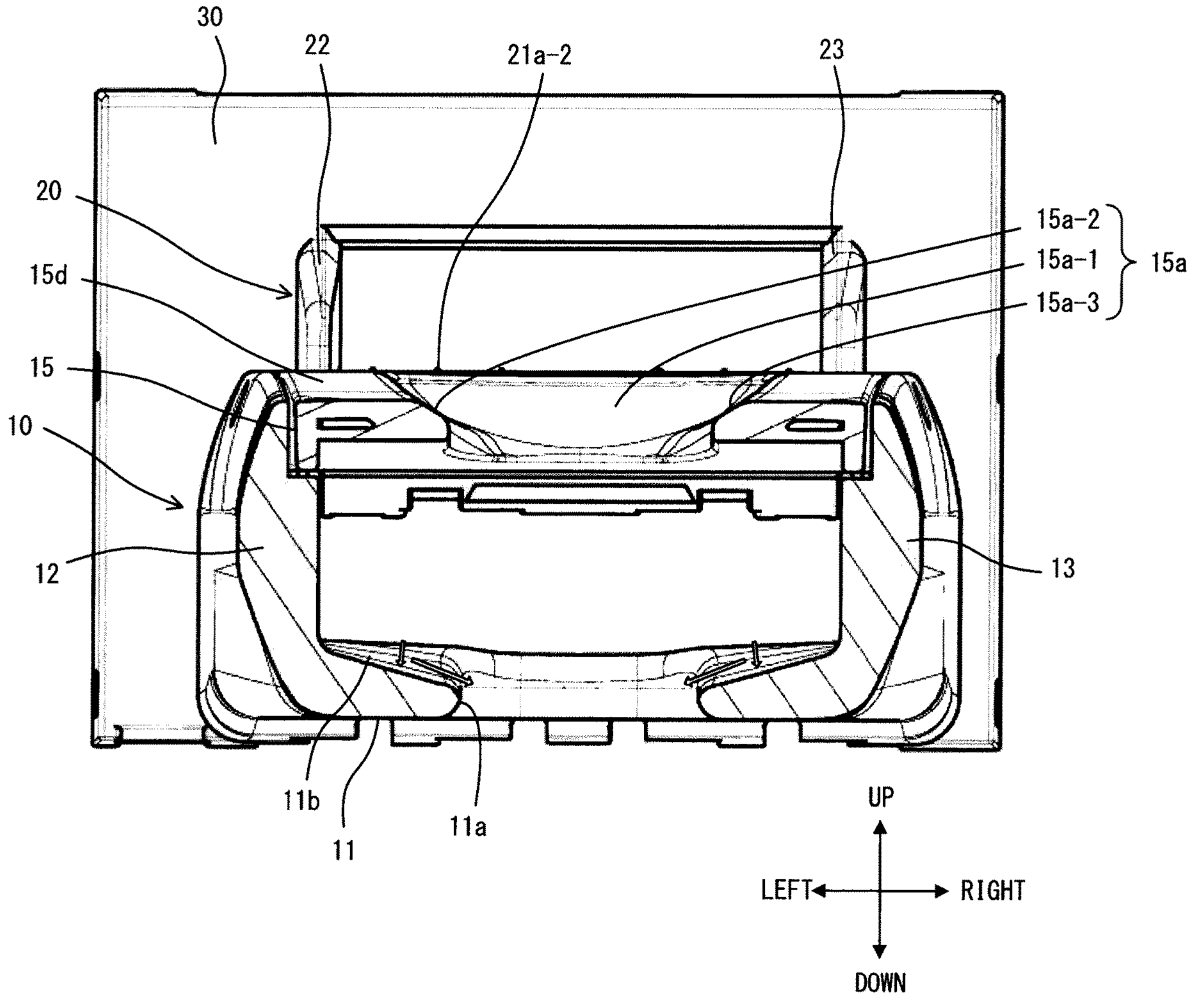
FIG. 6 is a cross-section at VI-VI in FIG. 4.
Figure 7:
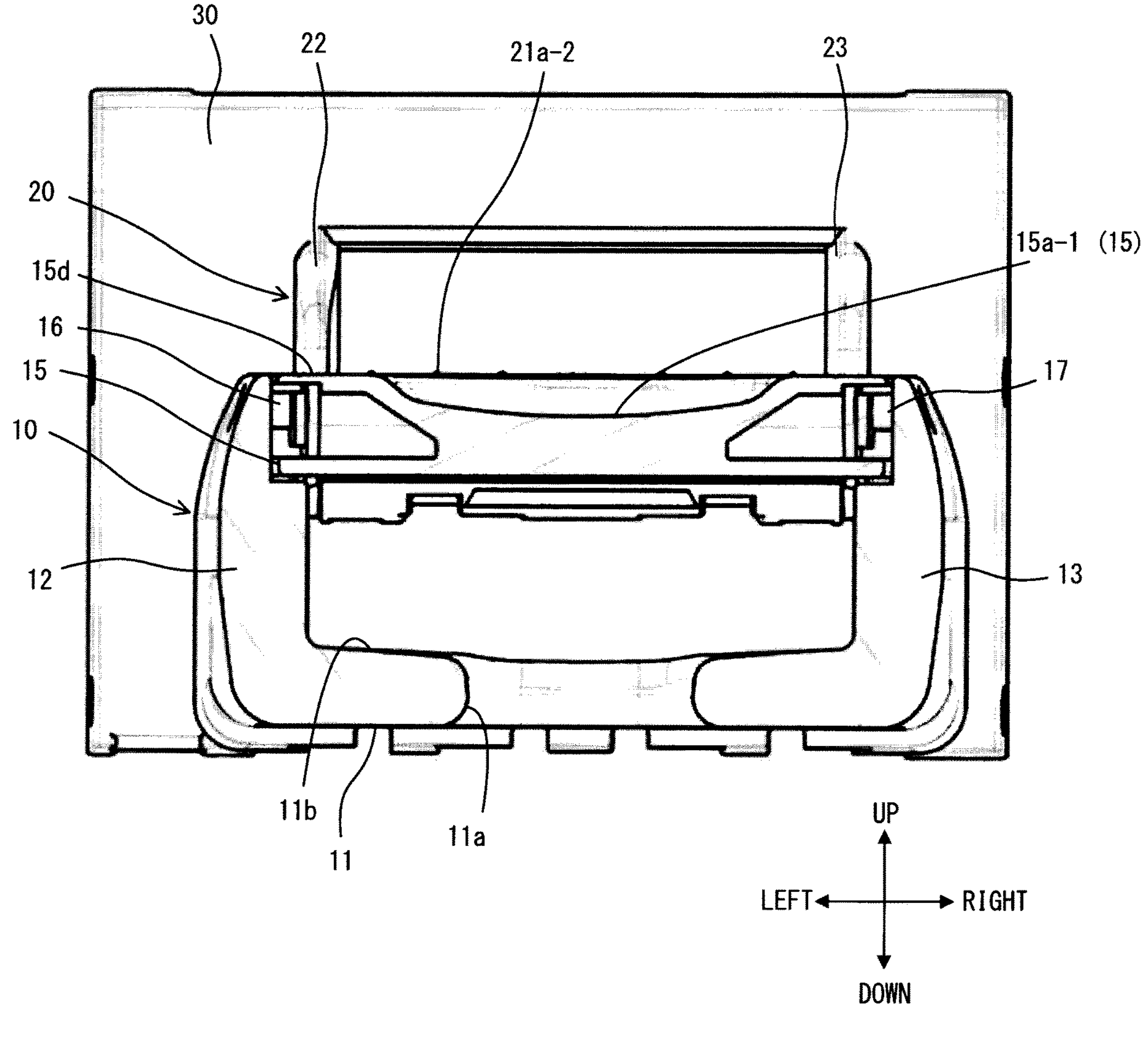
FIG. 7 is a cross-section at VII-VII in FIG. 4.

FIG. 5, FIG. 6, and FIG. 7 are a cross-section at V-V in FIG. 4, a cross-section at VI-VI, and a cross-section at VII-VII, respectively.

As illustrated in FIG. 3A and FIG. 3B, the dispenser unit 10 has a bottom portion 11, a pair of side walls 12 and 13, a front wall 14, a cover 15, and rotary shaft units 16 and 17. The bottom portion 11, the pair of side walls 12 and 13, the front wall 14, and the cover 15 function as an accumulation unit that contains a portion on a front side of paper money B (see FIG. 2B). Note that in the dispenser unit 10, the bottom portion 11, the pair of side walls 12 and 13, the front wall, and the rotary shaft units 16 and 17 are formed in an integrated manner with one another.

In the bottom portion 11, the front wall 14, and the cover 15 at the front edge of the dispenser unit 10, cutouts 11*a*, 14*a*, and 15*a* are provided. For example, the cutouts 11*a*, 14*a*, and 15*a* are provided at the center of the bottom portion 11, the front wall 14, and the cover 15 in the left-to-right direction.

The width of the cutouts 11*a*, 14*a*, and 15*a* in the left-to-right direction may be 2 cm or longer as an example and may be formed to be shorter than the width of paper money B so that the paper money B can be picked up with fingers F from both over and under the paper money B as illustrated in FIG. 5. Note that the cutout 15*a* on the cover 15 is not necessarily provided, but only the cutouts 11*a* and 14*a* may be provided on the bottom portion 11 and the front wall 14.

On the bottom portion 11, at least a portion on the front side of the paper money B is placed. As illustrated in FIG. 3B and FIG. 6, the height of the upper face 11*b* of the bottom portion 11, on the left and right sides of the cutout 11*a*, becomes lower toward the cutout 11*a*. For example on the left side of the cutout 11*a*, the height becomes lower toward the right throughout the upper face 11*b*, and on the right side of the cutout 11*a*, the height becomes lower toward the left throughout the upper face 11*b*. As illustrated in FIG. 3B, FIG. 6, and FIG. 7, the height of the upper face 11*b* of the bottom portion 11, on the left and right sides of the cutout 11*a*, becomes lower toward the front.

With this structure, as illustrated in FIG. 3B, when a foreign object such as a coin C falls down to or is placed on the upper face 11*b* on either the left or right side of the cutout 11*a*, the foreign object is guided toward the cutout 11*a* and drops to the dispenser unit 10 via the cutout 11*a*.

Note that as illustrated in FIG. 3B and FIG. 5, in the rear side from the rear edge of the cutout 11*a*, the height of the upper face 11*b* of the bottom portion 11 becomes lower toward the rear. In the rear side from the rear edge of the cutout 11*a*, the upper face 11*b* of the bottom portion 11 has seven pieces, for example, of guide projections 11*b*-1 that slightly project upward, extend in the front-to-rear direction, and are arranged at intervals.

Of the pair of side walls 12 and 13, the left side wall 12 is located at the left edge of the bottom portion 11 and the right side wall 13 is located at the right edge of the bottom portion 11. The front wall 11 is located at the front edge of the bottom portion 11.

The cover 15 is located above the bottom portion 11. As illustrated in FIG. 3A and FIG. 4 to FIG. 7, a rear face 15*a*-1 and left and right side faces 15*a*-2 and 15*a*-3 in a cutout 15*a* of the cover 15 are inclined or curved so that an opening space viewed from the top (see FIG. 4) becomes smaller toward the bottom. In addition, as illustrated in FIG. 5, the cutout 11*a* of the bottom portion 11 is provided to extend further rearward than the lower edge of the cutout 15*a* of the cover 15.

With this structure, when the above-described foreign object such as a coin C falls down to or is placed on the cover 15, the foreign object falls down through the cutout 15*a* of the cover 15 and drops to the dispenser unit 10 via the cutout 11*a* of the bottom portion 11.

As illustrated in FIG. 5 to FIG. 7, the rear face 15*a*-1 of the cutout 15*a* of the cover 15 is curved to sag downward in the center of the left-to-right direction so that the height of the center is lower than both the left and right sides toward the bottom.

Note that the rear face 15*a*-1 and one, not both, of the left and right side faces 15*a*-2 and 15*a*-3 of the cutout 15*a* of the cover 15 may be inclined or curved so that an opening space viewed from the top becomes smaller toward the bottom. Alternatively, in the cutout 15*a* of the cover 15, the opening space viewed from the top may be the same regardless of the position in the up-to-down direction.

As illustrated in FIG. 4, the width of the lower edge of the cutout 15*a* of the cover 15 is slightly wider in the left-to-right direction than the cutout 11*a* of the bottom portion 11. The width of these portions may be the same or the width of the cutout 11*a* of the bottom portion 11 may be wider. However, the cutouts 15*a* and 11*a* are preferably formed so that when a foreign object such as a coin C falls down to or is placed on the upper face 15*d* of the cover 15, the foreign object falls down through the cutout 15*a* of the cover 15 and drops to the dispenser unit 10 via the cutout 11*a* of the bottom portion 11, as described above.

As illustrated in FIG. 3A and FIG. 4, the cover 15 has arm units 15*b* and 15*c* extending rearward from both left and right edges. The left arm unit 15*b* is integrated, for example, with the rotary shaft unit 16 projecting leftward. The right arm unit 15*c* is integrated, for example, with the rotary shaft unit 17 projecting rightward.

The left rotary shaft unit 16 is rotatably inserted into the left side wall 12 and the right rotary shaft unit 17 is rotatably inserted into the right side wall 13. With this structure, as illustrated in FIG. 3B, the cover 15 is arranged in an openable/closable manner so that the cover 15 rotates on the rotary shaft units 16 and 17 as a rotating center and opens from the front edge side. In this manner, as illustrated in FIG. 5, a customer can make the cover 15 rotate and open and can take out paper money B by picking up the paper money B with fingers F from over and under the paper money B located at the dispense position P2 and lifting up the front edge side of the cover 15 with the paper money B picked up with the fingers F.

Note that when the cover 15 is closed as illustrated in FIG. 13A, together with portions of the bottom portion 11, the pair of side walls 12 and 13, and the front wall 14 except for the cutouts 11*a* 14*a*, and 15*a*, the cover 15 preferably covers an interior space of the dispenser unit 10. With this structure, as illustrated in FIG. 5, the front wall 14 can prevent paper money B-1 from falling out toward the front or the cover 15 can prevent paper money B-2 that is curled in the up-to-down direction from popping up.

The deposit unit 20 receives paper money B from the deposit position P1 (see FIG. 2A) above the dispense position P2 (see FIG. 2B) of the paper money B in the dispenser unit 10. As illustrated in FIG. 3 to FIG. 5, the deposit unit 20 has a bottom face guide 21. The upper face of the bottom face guide 21 is a guide face 21*a* that guides the bottom face of paper money B.

The deposit unit 20 has side face guides 22 and 23 that guide the left and right side faces of the paper money B. The side face guides 22 and 23 are located at the left edge and the right edge of the bottom face guide 21. The side face guides 22 and 23 project toward the front from a frame member 30 for attaching the dispenser unit 10 and the deposit unit 20 to the top module M1 illustrated in FIG. 1 to FIG. 2B. The side face guides 22 and 23 are preferably integrated with the frame member 30.

Note that when the dispenser unit 10 (or the deposit unit 20) is a separate portion from the deposit unit 20 (or the dispenser unit 10), the frame member 30, and the top module M1, the dispenser unit 10 (or the deposit unit 20) can be easily replaced with another one with a different shape in order to change a design of the paper money handling apparatus 1 or to accommodate various sizes of paper money B that are different for every countries.

This is merely an example, but the center of the dispenser unit 10 and the deposit unit 20 in the left-to-right direction is shifted rightward from the center of the frame member 30 in the left-to-right direction, as illustrated in FIG. 4, FIG. 6, and FIG. 7.

The cover 15, except for the arm units 15*b* and 15*c*, is located in the front of the bottom face guide 21. The upper face 15*d* of the cover 15 is formed so as to be continuous with the guide face 21*a* of the bottom face guide 21. For example, as illustrated in FIG. 5, the guide face 21*a* of the bottom face guide 21 is horizontal and the upper face 15*d* of the cover 15 is horizontal in a portion that is continuous with the front edge of the guide face 21*a* and is curved downward toward the front edge of the cover 15. The rear face 15*a*-1 of the cutout 15*a* of the cover 15 has an upper edge located at the same position as the front edge of the guide face 21*a*. However, the cutout 15*a* of the cover 15 may be provided in front of the front edge of the guide face 21*a*.

As illustrated in FIG. 3A to FIG. 4, the guide face 21 of the bottom face guide 21 has a lighting unit 21*a*-1 that is a lamp to inform a customer of the deposit position P1 of paper money B (see FIG. 2A). This lighting unit 21*a*-1 is a rectangular portion that is located at the center of the guide face 21*a* in the left-to-right direction and covers almost throughout the guide face 21*a* in the front-to-rear direction and is also three linear portions extending in the left-to-right direction on each of the left and right sides of the rectangular portion. The guide face 21*a* also has six pieces, for example, of guide projections 21*a*-2 that slightly project upward, extend in the front-to-rear direction, and are arranged at intervals.

As illustrated in FIG. 5, a light emitter unit 21*b* that is an LED light source, for example, emitting light L1 toward the upper face 11*b* of the bottom portion 11 of the dispenser unit 10 is arranged in the bottom face guide 21. The light emitter unit 21*b* emits light L1, for example, to inform a customer of the dispense position P2 (see FIG. 2B) of paper money B. The light L1 emitted by the light emitter unit 21*b* is reflected by the upper face 11*b* of the bottom portion 11 or the paper money B placed on the upper face 11*b* (reflected light L2). The reflected light L2 preferably passes at least through the rear face 15*a*-1 of the cutout 15*a* of the cover 15. For that reason, at least a portion of the cover 15 preferably has light permeability.

Note that, as described above, the rear face 15*a*-1 in the cutout 15*a* of the cover 15 is inclined or curved so that an opening space viewed from the top becomes smaller toward the bottom, or in other words, is inclined or curved toward the front. This structure allows a customer to easily recognize the reflected light L2 as the rear face 15*a*-1 is lit by the reflected light L2. Note that, as described above, because the rear face 15*a*-1 of the cutout 15*a* of the cover 15 is curved to sag downward in the center of the left-to-right direction so that the height of the center is lower than both the left and right sides toward the bottom, the customer can easily recognize the reflected light L2 as the reflected light L2 is collected at the rear face 15*a*-1. When at least a portion of the cover 15 (a portion rearward of the cutout 15*a*) is translucent, a customer can more easily recognize the reflected light L2 than when the portion is transparent.

Note that the dispenser unit 10 may have a locking mechanism that locks the cover 15 in a closed state at times other than dispensing paper money B. For example, as described above, when the take-in carrier 60 illustrated in FIG. 2A and FIG. 2B carries paper money B remaining in the dispenser unit 10, the cover 15 is preferably locked in a closed state so that the paper money B in the dispenser unit 10 is not taken out by a customer or that a foreign object does not enter the dispenser unit 10.

In the present embodiments described above, the paper money handling apparatus 1 is a paper money handling apparatus 1 provided with a dispenser unit 10 for dispensing paper money B, and the dispenser unit 10 has a bottom portion 11 on which at least a portion on the front side of the paper money B is placed, a pair of side walls 12 and 13 located at both lift and right edges of the bottom portion 11, a front wall 14 located at the front edge of the bottom portion 11, and a cover 15 located above the bottom portion 11. At the front edge of the dispenser unit 10, cutouts 11*a* and 14*a* are provided at least in the bottom portion 11 and the front wall 14, and the cover 15 is arranged in an openable/closable manner so that the cover 15 rotates and opens from the front edge side.

The paper money B dispensed to the dispenser unit 10 is positioned by the bottom portion 11, the pair of side walls 12 and 13, the front wall 14, and the cover 15. This structure, as illustrated in FIG. 5, can prevent paper money B-1 from falling out toward the front, prevent curled paper money B-2 from popping up from the dispenser unit 10, and can also prevent jamming in the dispenser unit 10. As a result, dispensing paper money B at a desirable dispense position P2 can be more facilitated. In addition, the cutouts 11*a* and 14*a* provided at least in the bottom portion 11 and the front wall 14 allow a customer to easily pick up paper money B with fingers F and to easily take out the paper money B.

According to the present embodiments, a customer can easily take out paper money B dispensed to the dispenser unit 10.

In the present embodiments, the height of the upper face 11*b* of the bottom portion 11, at least on both the left and right sides of the cutout 11*a*, becomes lower toward the cutout 11*a*. With this structure, a foreign object such as a coin C illustrated in FIG. 3B can be guided toward the cutout 11*a* and drops to the dispenser unit 10 via the cutout 11*a*.

In the present embodiments, the cutouts 11*a*, 14*a*, and 15*a* are provided in the bottom portion 11, the front wall 14, and the cover 15. With this structure, a customer can insert fingers F into the cutouts 11*a*, 14*a*, and 15*a* from above the cover 15 and below the bottom portion 11, and thus the customer can easily pick up paper money B. As a result, a customer can more easily take out paper money B.

In the present embodiments, at least one of the rear face 15*a*-1 and the side faces 15*a*-2 and 15*a*-3 in the cutout 15*a* of the cover 15 are inclined or curved so that an opening space viewed from the top becomes smaller toward the bottom. This structure can drop a foreign object such as a coin C to the dispenser unit 10 through the cutout 15*a* of the cover 15 and via the cutout 11*a* of the bottom portion 11. Moreover, when the cover 15 is located in the front of a bottom face guide 21, a customer can easily insert paper money B into the deposit unit 20.

In the present embodiments, the paper money handling apparatus 1 further includes a deposit unit 20 to which paper money B is deposited from a deposit position P1 above a dispense position P2 of paper money B in the dispenser unit 10. The deposit unit 20 has a bottom face guide 21 including a guide face 21*a* that guides the bottom face of paper money B and the cover 15 except for arm units 15*b* and 15*c* (an example of at least a portion of the cover 15) is located in the front of the bottom face guide 21. With this structure, the cover 15 can guide paper money B inserted into the deposit unit 20 with the upper face 15*d* or the cutout 15*a*, and thus a customer can easily insert paper money B into the deposit unit 20.

In the present embodiments, the upper face 15*d* of the cover 15 is formed so as to be continuous with the guide face 21*a* of the bottom face guide 21. With this structure, the upper face 15*d* of the cover 15 can easily guide paper money B inserted into the deposit unit 20 and thus a customer can more easily insert paper money B into the deposit unit 20.

In the present embodiments, as illustrated in FIG. 5, the bottom face guide 21 further includes a light emitter unit 21*b* that emits light (light L1) to the upper face 11*b* of the bottom portion 11, and the cover 15 passes through light (reflected light L2) emitted by the light emitter unit 21*b* and reflected by the bottom portion 11 or the paper money B placed on the bottom portion 11. With this structure, a customer can easily recognize the dispense position P2 of paper money B informed by the reflected light L2 from the light L1 emitted by the light emitter unit 21*b*. As a result, a customer can more easily take out paper money B.

Note that the present invention is not limited to the embodiments described above, but components can be modified and embodied without departing from the scope of the invention at the implementation. In addition, various inventions may be formed by appropriate combination of multiple components disclosed in the embodiments. For example, all components provided in the embodiments may be combined as appropriate. In this manner, the present invention can take various modifications or applications without departing from the scope of the invention.

What is claimed is:

1. A paper money handling apparatus including a dispenser configured to dispense paper money, the dispenser comprising:

a bottom portion on which at least a portion on a front side of the paper money is placed;

a pair of side walls located at both left and right sides of the bottom portion;

a front wall located at a front edge of the bottom portion and configured to prevent the paper money from falling out toward the front; and a cover located above the bottom portion and configured to prevent the paper money that is curled in an up-to-down direction from popping up, wherein a front edge of the dispenser has a cutout at least in the bottom portion and the front wall, wherein the cutout is configured to help a customer to easily pick up the paper money with fingers and to easily take out the paper money, and the cover is arranged in an openable or closable manner so that the cover rotates and opens from a side of the front edge.

2. The paper money handling apparatus according to claim 1, wherein at least on both left and right sides of the cutout, a height of an upper face of the bottom portion becomes lower toward the cutout.

3. The paper money handling apparatus according to claim 1, wherein the cutout is provided in the bottom portion, the front wall and the cover.

4. The paper money handling apparatus according to claim 3, wherein at least one of a rear face and side faces in the cutout of the cover are inclined or curved so that an opening space viewed from a top becomes smaller toward bottom.

5. The paper money handling apparatus according to claim 1, further comprising a deposit to which the paper money is from a deposit position above a dispense position of the paper money in the dispenser, wherein the deposit has a bottom face guide including a guide face that guides a bottom face of the paper money, and at least a portion of the cover is located in front of the bottom face guide.

6. The paper money handling apparatus according to claim 5, wherein an upper face of the cover is formed so as to be continuous with the guide face of the bottom face guide.

7. The paper money handling apparatus according to claim 5, wherein the bottom face guide further includes a light emitter that emits light to the upper face of the bottom portion, the cover has light permeability, and the light emitter is configured to emit light so that the light reflected by the bottom portion or the paper money placed on the bottom portion passes through the cover.

* * * * *